United States Patent
Xuan et al.

(10) Patent No.: US 10,291,510 B2
(45) Date of Patent: May 14, 2019

(54) TOPOLOGY STRUCTURE DISCOVERY METHOD AND DEVICE

(71) Applicant: Huawei Technologies Co., Ltd., Shenzhen (CN)

(72) Inventors: Yuanzhe Xuan, Shenzhen (CN); Rong Wang, Shenzhen (CN); Zhefeng Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 184 days.

(21) Appl. No.: 14/996,799

(22) Filed: Jan. 15, 2016

(65) Prior Publication Data

US 2016/0134510 A1    May 12, 2016

Related U.S. Application Data

(63) Continuation of application No. PCT/CN2014/081347, filed on Jul. 1, 2014.

(30) Foreign Application Priority Data

Jul. 25, 2013   (CN) .......................... 2013 1 0318048

(51) Int. Cl.
   *H04L 12/26*   (2006.01)
   *H04L 12/751*  (2013.01)
   (Continued)

(52) U.S. Cl.
   CPC .............. *H04L 45/02* (2013.01); *H04L 41/12* (2013.01); *H04L 45/20* (2013.01); *H04L 45/42* (2013.01); *H04L 45/54* (2013.01); *H04L 45/306* (2013.01)

(58) Field of Classification Search
   None
   See application file for complete search history.

(56) References Cited

U.S. PATENT DOCUMENTS

| 2004/0260755 | A1  | 12/2004 | Bardzil et al. |
| 2005/0071469 | A1* | 3/2005  | McCollom .......... H04L 67/1002 709/225 |

(Continued)

FOREIGN PATENT DOCUMENTS

| CN | 1794715 A   | 6/2006  |
| CN | 101572900 A | 11/2009 |
| CN | 102204188 A | 9/2011  |

OTHER PUBLICATIONS

Ansari et al., "ForCES Element Bindings and Topology Discovery Protocol," Internet Draft, draft-ansari-forces-discovery-00.txt, pp. 1-15, IETF Trust, Reston, Virginia (Jul. 10, 2004).

(Continued)

*Primary Examiner* — Zewdu A Beyen
(74) *Attorney, Agent, or Firm* — Leydig, Voit & Mayer, Ltd.

(57) ABSTRACT

A topology structure discovery method and device. The topology structure discovery method includes: a controller acquiring topology structures among N routers; according to the topology structures, the controller obtaining routing tables respectively corresponding to each router, and respectively sending corresponding routing tables to each router, wherein the routing tables comprise at least one kind of routing information between the router and other N−1 routers and routing information between the router and the controller, so that the controller can obtain the topology structures of the whole network and calculate the router capable of obtaining the optimal path according to the topology structures of the whole network, thereby improving the utilization efficiency and the throughput of the network.

16 Claims, 3 Drawing Sheets

(51) Int. Cl.
*H04L 12/717* (2013.01)
*H04L 12/24* (2006.01)
*H04L 12/733* (2013.01)
*H04L 12/741* (2013.01)
*H04L 12/725* (2013.01)

(56) References Cited

U.S. PATENT DOCUMENTS

2006/0133300 A1    6/2006   Lee et al.
2007/0070983 A1*   3/2007   Redi .................. H04W 40/248
                                                                        370/352
2013/0286893 A1    10/2013   Zhu et al.
2014/0122683 A1*   5/2014   Zhao ....................... H04L 45/64
                                                                      709/223
2014/0126346 A1*   5/2014   Van Greunen .... H04W 52/0222
                                                                      370/216

OTHER PUBLICATIONS

Torres et al., "Controller-based Routing Scheme for Named Data Network," Electrical Engineering Program, COPPE/UFJR, Tech. Rep, Universidade Federal do Rio de Janeiro, Rio de Janeiro, Brazil (Dec. 1, 2012).

* cited by examiner

TOPOLOGY STRUCTURE DISCOVERY METHOD AND DEVICE

CROSS-REFERENCE TO RELATED APPLICATIONS

This application is a continuation of International Patent Application No. PCT/CN2014/081347, filed on Jul. 1, 2014, which claims priority to Chinese Patent Application No. 201310318048.2 filed on Jul. 25, 2013, both of which are hereby incorporated by reference in their entireties.

FIELD

The present application relates to communication technology and, in particular, to a topology discovery method and a topology discovery device.

BACKGROUND

With the development of Internet, more and more people acquire information over the Internet, such as network news, a search engine, a network music, a network video, a social networking site and a network forum. Information centric networking (abbreviated to "ICN" hereinafter) is a network focusing on information contents, such as a named data network (abbreviated to "NDN" hereinafter) or a content centric networking (abbreviated to "CCN" hereinafter).

In conventional technologies, a router firstly transmits information of the router itself to an adjacent router, and then the adjacent router transmits the information of the router and information of the adjacent router itself to a router adjacent to the adjacent router. In this way, the information of the router is spread step by step to a whole network.

However, it is difficult for routers in the information centric network to acquire a topology of the whole network and thus a routing of a preferable path.

SUMMARY

The present application provides a topology discovery method and a topology discovery device, for acquiring a topology of a whole network.

In a first aspect, a topology discovery method according to an embodiment of the present application includes:

acquiring, by a controller, a topology among N routers, where N is an integer greater than or equal to 1;

acquiring, by the controller, routing tables corresponding to respective routers among the N routers based on the topology; and transmitting each routing table to a corresponding router, where each routing table includes at least one of the followings: routing information between a router and the other N−1 routers and routing information between a router and the controller.

In a first possible implementation of the first aspect, the acquiring, by the controller, the topology among the N routers includes:

transmitting, by the controller, to a first router a first topology discovery request for requesting a first topology between the first router and a second router; where the first router is connected to the second router and a distance between the first router and the second router is one hop; and the first router is connected to the controller and a distance between the first router and the controller is one hop; and receiving, by the controller, a first topology discovery response from the first router, where the first topology discovery response carries the first topology between the first router and the second route.

In conjunction with the first possible implementation of the first aspect, in a second possible implementation of the first aspect, after the receiving, by the controller, the first topology discovery response from the first router, the method further includes:

transmitting, by the controller, to an M-th router an M-th topology discovery request for requesting an M-th topology between the M-th router and an (M+1)-th router; where the M-th router is connected to the (M+1)-th router and a distance between the M-th router and the (M+1)-th router is one hop; and a distance between the M-th router and the controller is M hops, where M is an integer greater than or equal to 2 and less than or equal to N; and receiving, by the controller, an M-th topology discovery response from the M-th router, where the M-th topology discovery response carries the M-th topology between the M-th router and the (M+1)-th router.

In a third possible implementation of the first aspect, the acquiring, by the controller, the topology among the N routers includes:

receiving, by the controller, a topology information report request transmitted by each router of the N routers in a broadcasting way, where the topology information report request carries an adjacent topology between the each router of the N routers and an adjacent router, the adjacent router is connected to the each router, and a distance between the adjacent router and the each router is one hop.

In conjunction with the third possible implementation of the first aspect, in a fourth possible implementation of the first aspect, the acquiring, by the controller, routing tables corresponding to the respective routers based on the topology; and transmitting each routing table to a corresponding router includes:

acquiring, by the controller for each router, a routing table corresponding to the router and a routing table corresponding to an adjacent router based on a preset strategy and the adjacent topology between the each router of the routers and the adjacent router; and transmitting, by the controller, each of the routing tables to a respective router.

In conjunction with any one of the first possible implementation to the fourth possible implementation of the first aspect, in a fifth possible implementation of the first aspect, after acquiring, by the controller, routing tables corresponding to the respective routers based on the topology; and transmitting each of the routing tables to a corresponding router, the method further includes:

acquiring, by the controller, change information of a router, where the change information of the router includes a new added router, a new added link to the router, failure of the router or failure of a link to the router; and acquiring, by the controller, a new routing table based on the change information of the router and transmitting the new routing table to the router corresponding to the new routing table.

In conjunction with the fifth possible implementation of the first aspect, in a sixth possible implementation of the first aspect, the acquiring, by the controller, change information of a router includes:

transmitting, by the controller, a topology information change query request to the first router or a K-th router which having K hops of the distance to the first router, to request to query change information of the first router, where the K-th router is directly or indirectly connected to the controller, where K is an integer greater than 1; and receiving, by the controller, a topology information change query response from the first router or the K-th router to acquire the change information of the first router.

In conjunction with the fifth possible implementation of the first aspect, in a seventh possible implementation of the first aspect, the acquiring, by the controller, change information of a router includes:

receiving, by the controller, a topology information report request from the first router or a K-th router to acquire change information of the first router; where a distance between the K-th router and the first router is K hops, the K-th router is directly or indirectly connected to the controller, and K is an integer greater than 1.

In conjunction with any one of the first aspect to the seventh possible implementation of the first aspect, in an eighth possible implementation of the first aspect, before the acquiring, by a controller, a topology among the N routers, the method further includes:

transmitting, by the controller, a neighbor discovery request to a first router for requesting an identifier of the first router; or transmitting, by the controller, a neighbor discovery response to a first router in response to a neighbor discovery request received from the first router, where the neighbor discovery request is configured to request an identifier of the controller adjacent to the first router or an identifier of a router adjacent to the first router, and the neighbor discovery response carries the identifier of the controller.

In conjunction with any one of the first possible implementation and the second possible implementation of the first aspect, in a ninth possible implementation of the first aspect, both the first topology discovery request and the first topology discovery response carry at least one of the followings: the same content name, an identifier of the controller, and an identifier of the first router.

In conjunction with the second possible implementation of the first aspect, in a tenth possible implementation of the first aspect, both the M-th topology discovery request and the M-th topology discovery response carry at least one of the followings: the same content name, an identifier of the controller, and an identifier of the M-th router.

In conjunction with the eighth possible implementation of the first aspect, in an eleventh possible implementation of the first aspect, both a keyword of the neighbor discovery request and a keyword of the neighbor discovery response are NeighborDiscovery.

In conjunction with the first or second possible implementation of the first aspect, in a twelfth possible implementation of the first aspect, both a keyword of the first topology discovery request and a keyword of the first topology discovery response are CTL and RouteTo.

In conjunction with the second possible implementation of the first aspect, in a thirteenth possible implementation of the first aspect, both a keyword of the M-th topology discovery request and a keyword of the M-th topology discovery response are CTL and RouteTo.

In conjunction with the third or fourth possible implementation of the first aspect, in a fourteenth possible implementation of the first aspect, a keyword of the topology information report request is TopologyDiscovery.

In conjunction with the sixth possible implementation of the first aspect, in a fifteenth possible implementation of the first aspect, both a keyword of the topology information change query request and a keyword of the topology information change query response are CTL and NeighborinfoUpdate.

In a second aspect, a topology discovery method includes:

transmitting, by a first router, a topology among network nodes in a network to a controller, where the network includes N routers, the first router is one of the N routers, and N is an integer greater than or equal to 1; and receiving, by the first router, a routing table from the controller, where the routing table is generated by the controller based on the topology.

In a first possible implementation of the second aspect, the transmitting, by the first router, the topology among network nodes in a network to a controller includes:

receiving, by the first router, a first topology discovery request from the controller for requesting a first topology between the first router and a second router, where the first router is physically connected to the second router and a distance between the first router and the second router is one hop; and transmitting, by the first router, a first topology discovery response to the controller, where the first topology discovery response carries the first topology between the first router and the second router.

In a second possible implementation of the second aspect, the transmitting, by the first router, the topology among network nodes in a network to a controller includes:

transmitting, by the first router, a topology information report request to the controller in a broadcasting way, where the topology information report request carries an adjacent topology between the first router and a second router, where the first router is directly physically connected to the second router and a distance between the first router and the second router is one hop; and receiving, by the first router, a topology information report response from the controller, where the topology information report response carries the number of hops from the controller to the first router, the first router determines a routing to the controller based on the number of hops and stores the routing into a routing table set on the first router.

In conjunction with any one of the second aspect to the second possible implementation of the second aspect, in a third possible implementation of the second aspect, before the transmitting, by the first router, the topology among network nodes in a network, the method further includes:

receiving, by the first router, a neighbor discovery request from the controller for requesting a physical identifier of the first router; or receiving, by the first router, a neighbor discovery response from the controller after a neighbor discovery request is transmitted to the controller, where the neighbor discovery request is configured to request an identifier of the controller adjacent to the first router or an identifier of a router adjacent to the first router, and the neighbor discovery response carries the identifier of the controller.

In conjunction with any one of the second aspect to the third possible implementation of the second aspect, in a fourth possible implementation of the second aspect, after the receiving, by the first router, a routing table from the controller, the method further includes:

transmitting, by the first router, change information on the network to the controller, where the change information includes a new added link to the first router, failure of the first router, or failure of a link to the first router in the network; and receiving, by the first router, the routing table from the controller.

In conjunction with the fourth possible implementation of the second aspect, in a fifth possible implementation of the second aspect, the transmitting, by the first router, change information on the network to the controller includes:

receiving, by the first router, a topology information change query request from the controller for requesting to query change information of the first router; and transmitting, by the first router, a topology information change query response to the controller, where the topology information change query response carries the change information of the first router.

In conjunction with the fourth possible implementation of the second aspect, in a sixth possible implementation of the second aspect, the transmitting, by the first router, change information on the network to the controller includes:

transmitting, by the first router, a topology information report request to the controller, to inform the controller of the change information of the first router, where the topology information change report request carries the change information of the first router.

In conjunction with the first possible implementation of the second aspect, in a seventh possible implementation of the second aspect, both the first topology discovery request and the first topology discovery response carry at least one of the followings: a same content name, an identifier of the controller, and an identifier of the first router.

In conjunction with the second possible implementation of the second aspect, in an eighth possible implementation of the second aspect, both the topology information report request and the topology information report response carry at least one of the followings: a same content name, an identifier of the controller, and an identifier of the first router.

In conjunction with the third possible implementation of the second aspect, in a ninth possible implementation of the second aspect, both the neighbor discovery request and the neighbor discovery response carry at least one of the followings: a same content name, an identifier of the controller, and an identifier of the first router; and/or both a keyword of the neighbor discovery request and a keyword of the neighbor discovery response are NeighborDiscovery.

In conjunction with the first possible implementation of the second aspect, in a tenth possible implementation of the second aspect, both a keyword of the first topology discovery request and a keyword of the first topology discovery response are CTL and RouteTo.

In conjunction with the second possible implementation of the second aspect, in an eleventh possible implementation of the second aspect, both a keyword of the topology information report request and a keyword of the topology information report response are CTL and TopologyDiscovery.

In conjunction with the fifth possible implementation of the second aspect, in an twelfth possible implementation of the second aspect, both a keyword of the topology information change query request and a keyword of the topology information change query response are CTL and NeighborinfoUpdate.

In a third aspect, a topology discovery device according to an embodiment of the present application includes:

an acquisition module configured to acquire a topology among N routers, where N is an integer greater than or equal to 1; and a processing module configured to acquire routing tables corresponding to the respective routers and transmit each of the routing tables to a corresponding router, where the routing table includes at least one of the followings: routing information between the corresponding router and other N−1 routers and routing information between the corresponding router and a controller.

In a first possible implementation of the third aspect, the acquisition module is configured to transmit to a first router a first topology discovery request for requesting a first topology between the first router and a second router, where the first router is physically connected to the second router and a distance between the first router and the second router is one hop, and the first router is physically connected to the controller and a distance between the first router and the controller is one hop; and receive a first topology discovery response from the first router, where the first topology discovery response carries the first topology between the first router and the second router.

In conjunction with the first possible implementation of the third aspect, in a second possible implementation of the third aspect, the acquisition module is further configured to transmit to an M-th router an M-th topology discovery request for requesting an M-th topology between the M-th router and an (M+1)-th router, where the M-th router is physically connected to the (M+1)-th router and a distance between the M-th router and the (M+1)-th router is one hop, and a distance between the M-th router and the controller is M hops, where M is an integer greater than or equal to 2 and less than or equal to N; and receive an M-th topology discovery response from the M-th router, where the M-th topology discovery response carries the M-th topology between the M-th router and an (M+1)-th router.

In a third possible implementation of the third aspect, the acquisition module is configured to receive a topology information report request transmitted by each router of the routers in a broadcasting way, where the topology information report request carries an adjacent topology between the each router of the routers and an adjacent router of the each router of the routers, and the adjacent router is physically connected to the each router of the routers, and a distance between the adjacent router and the each router of the routers is one hop.

In conjunction with the third possible implementation of the third aspect, in a fourth possible implementation of the third aspect, the acquisition module is configured to acquire a routing table corresponding to the each router of the routers and a routing table corresponding to the adjacent router, based on a preset strategy and the adjacent topology between the each router of the routers and the adjacent router; and the processing module is configured to transmit the routing table to a router corresponding to the routing table.

In conjunction with any one of the first to fourth possible implementations of the third aspect, in a fifth possible implementation of the third aspect, the acquisition module is further configured to acquire change information of a router, where the change information of the router includes a new added router, a new added link to the router, failure of the router, or failure of a link to the router; and the processing module is further configured to acquire a new routing table based on the change information of the router, and transmit the new routing table to a router corresponding to the new routing table.

In conjunction with the fifth possible implementation of the third aspect, in a sixth possible implementation of the third aspect, the acquisition module is configured to transmit a topology information change query request to the first router or a K-th router having K hops of a distance to the first router, to request to query change information of the first router, where the K-th router is directly or indirectly connected to the controller, and K is an integer greater than 1; and receive a topology information change query response from the first router or the K-th router to acquire the change information of the first router.

In conjunction with the fifth possible implementation of the third aspect, in a seventh possible implementation of the third aspect, the acquisition module is configured to receive a topology information report request from the first router or a K-th router to acquire the change information of the first router, where a distance between the K-th router and the first router is K hops, the K-th router is directly or indirectly connected to the controller, and K is an integer greater than 1.

In conjunction with any one of the third aspect to the seventh possible implementation of the third aspect, in an eighth possible implementation of the third aspect, the topology discovery device further includes:

a transmitting module configured to transmit to a first router a neighbor discovery request for requesting an identifier of the first router; or a transmitting module configured to transmit a neighbor discovery response to a first router in response to a neighbor discovery request received from the first router, where the neighbor discovery request is configured to request an identifier of the controller adjacent to the first router or an identifier of a router adjacent to the first router, and the neighbor discovery response carries the identifier of the controller.

In conjunction with any one of the first and second possible implementations of the third aspect, in a ninth possible implementation of the third aspect, both the first topology discovery request and the first topology discovery response carry at least one of the followings: the same content name, an identifier of the controller and an identifier of the first router.

In conjunction with the second possible implementation of the third aspect, in a tenth possible implementation of the third aspect, both the M-th topology discovery request and the M-th topology discovery response carry at least one of the followings: the same content name, an identifier of the controller and an identifier of the M-th router.

In conjunction with the eighth possible implementation of the third aspect, in an eleventh possible implementation of the third aspect, both a keyword of the neighbor discovery request and a keyword of the neighbor discovery response are NeighborDiscovery.

In conjunction with the first or second possible implementation of the third aspect, in a twelfth possible implementation of the third aspect, both a keyword of the first topology discovery request and a keyword of the first topology discovery response are CTL and RouteTo.

In conjunction with the second possible implementation of the third aspect, in a thirteenth possible implementation of the third aspect, both a keyword of the M-th topology discovery request and a keyword of the M-th topology discovery response are CTL and RouteTo.

In conjunction with the third or fourth possible implementation of the third aspect, in a fourteenth possible implementation of the third aspect, a keyword of the topology information report request is TopologyDiscovery.

In conjunction with the sixth possible implementation of the third aspect, in a fifteenth possible implementation of the third aspect, both a keyword of the topology information change query request and a keyword of the topology information change query response are CTL and NeighborinfoUpdate.

In a fourth aspect, a topology discovery device includes:

a transmitting module configured to transmit a topology among network nodes in a network to a controller, where the network includes N routers, and the topology discovery device is one of the N routers, where N is an integer greater than or equal to 1; and a receiving module configured to receive a routing table from the controller, where the routing table is generated by the controller based on the topology.

In a first possible implementation of the fourth aspect, the receiving module is configured to receive from the controller a first topology discovery request for requesting a first topology between a first router and a second router, where the first router is physically connected to the second router and a distance between the first router and the second router is one hop; and to transmit a first topology discovery response to the controller, where the first topology discovery response carries the first topology between the first router and the second router.

In a second possible implementation of the fourth aspect, the transmitting module is configured to transmit a topology information report request to the controller in a broadcasting way, where the topology information report request carries an adjacent topology between a first router and a second router, and the first router is physically connected to the second router and a distance between the first router and the second router is one hop; and the receiving module is configured to receive a topology information report response from the controller, where the topology information report response carries the number of hops from the controller to the first router, where the first router determines a routing to the controller based on the number of hops and stores the routing into a routing table set on the first router.

In conjunction with any one of the fourth aspect to the second possible implementations of the fourth aspect, in a third possible implementation of the fourth aspect, the receiving module is further configured to receive from the controller a neighbor discovery request for requesting a physical identifier of the first router; or the receiving module is further configured to receive a neighbor discovery response from the controller after a neighbor discovery request is transmitted to the controller, where the neighbor discovery request is configured to request an identifier of the controller adjacent to the first router or an identifier of a router adjacent to the first router, and the neighbor discovery response carries the identifier of the controller.

In conjunction with any one of the fourth aspect to the third possible implementation of the fourth aspect, in a fourth possible implementation of the fourth aspect, the transmitting module is further configured to transmit change information on the network to the controller, the change information includes a new added link to the first router, failure of the first router, or failure of a link to the first router in the network; and the receiving module is further configured to receive the routing table from the controller.

In conjunction with the fourth possible implementation of the fourth aspect, in a fifth possible implementation of the fourth aspect, the receiving module is configured to receive from the controller a topology information change query request for requesting to query change information of the first router; and the transmitting module is configured to transmit a topology information change query response to the controller, with the topology information change query response carrying the change information of the first router.

In conjunction with the fourth possible implementation of the fourth aspect, in a sixth possible implementation of the fourth aspect, the transmitting module is configured to transmit a topology information report request to the controller, to inform the controller of change information of the first router, where the topology information report request carries the change information of the first router.

In conjunction with the first possible implementation of the fourth aspect, in a seventh possible implementation of the fourth aspect, both the first topology discovery request and the first topology discovery response carry at least one of the followings: a same content name, an identifier of the controller, and an identifier of the first router.

In conjunction with the second possible implementation of the fourth aspect, in an eighth possible implementation of the fourth aspect, both the topology information report request and the topology information report response carry at least one of the followings: the same content name, an identifier of the controller, and an identifier of the first router.

In conjunction with the third possible implementation of the fourth aspect, in a ninth possible implementation of the fourth aspect, both the neighbor discovery request and the neighbor discovery response carry at least one of the followings: the same content name, an identifier of the controller, and an identifier of the first router; and/or both a keyword of the neighbor discovery request and a keyword of the neighbor discovery response are NeighborDiscovery.

In conjunction with the first possible implementation of the fourth aspect, in a tenth possible implementation of the fourth aspect, both a keyword of the first topology discovery request and a keyword of the first topology discovery response are CTL and RouteTo.

In conjunction with the second possible implementation of the fourth aspect, in an eleventh possible implementation of the fourth aspect, both a keyword of the topology information report request and a keyword of the topology information report response are CTL and TopologyDiscovery.

In conjunction with the fifth possible implementation of the fourth aspect, in a twelfth possible implementation of the fourth aspect, both a keyword of the topology information change query request and a keyword of the topology information change query response are CTL and NeighborinfoUpdate.

In the topology discovery method according to the embodiments of the present application, the controller acquires the topology among the N routers, acquires a routing tables corresponding to the respective routers based on the topology, and transmits each of the routing tables to a corresponding router of the routing table. The routing table includes at least one of routing information between the corresponding router and other N−1 routers and routing information between the corresponding router and the controller. Therefore, the controller may obtain a topology of a whole network and may calculate a routing for an optimal path based on the topology of the whole network, thereby improving the utilization efficiency and throughput of the network.

BRIEF DESCRIPTION OF THE DRAWINGS

The drawings to be used in the description of the embodiments of the application or the conventional technology will be described briefly as follows, so that the technical solutions according to the embodiments of the present application or according to the conventional technology will become clearer. It is apparent that the drawings in the following description only illustrate some embodiments of the present application. For those skilled in the art, other drawings may be obtained according to these drawings without any creative work.

DETAILED DESCRIPTION OF EMBODIMENTS

In order that the objectives, technical solutions and advantages of the present application can be clearer, the technical solution according to the embodiments of the present application will be described clearly and completely as follows in conjunction with the drawings. It is apparent that the described embodiments are only a few rather than all of the embodiments according to the present application. Any other embodiments obtained by those skilled in the art based on the embodiments in the present application without any creative work fall in the scope of the present application.

Figure 1:
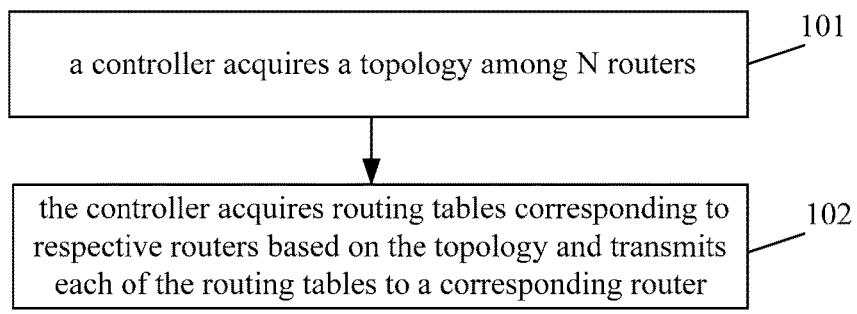
FIG. 1 is a flowchart of a topology discovery method according to an embodiment of the present application.

FIG. 1 is a flowchart of a topology discovery method according to an embodiment of the present application. As shown in FIG. 1, the method according to the embodiment includes:

In step 101, a controller acquires a topology among N routers.

In the embodiment, the topology is defined as a manner in which N routers are connected with each other, i.e. the topology among the routers, where N is an integer greater than 1.

In a network, the controller is physically connected to a router adjacent to the controller, and a router is physically connected to a router adjacent to the router. Thus, the controller is not necessary to physically connect with all the routers in the network directly. However, the controller may interact with all the routers by transmitting a control instruction. A physical connection may be a point-to-point adjacent connection relationship established through a link layer and a physical connection.

The controller may acquire the topology among the N routers at least in the following two ways.

In a first way, firstly, the controller transmits to a first router a first topology discovery request for requesting a first topology between the first router and a second router. The first router is adjacent to the second router, that is, the first router is physically connected to the second router and a distance between the first router and the second router is one hop. Then, the controller receives a first topology discovery response from the first router, with the first topology discovery response carrying the first topology between the first router and the second router. For example, the first topology discovery response may carry an identifier of the second router and a port number of a port of the first router via which the first router is connected to the second router. Thus, the controller acquires the first topology between the first router and the second router based on the identifier of the second router adjacent to the first router. That is, the controller acquires a two-hop or less-than-two-hop topology. It should be noted that at least one second router is adjacent to the first router.

Next, the controller may transmit to the M-th router an M-th topology discovery request for requesting an M-th topology between an M-th router and an N-th router. The M-th router is adjacent to the N-th router. That is, the M-th router is physically connected to the N-th router and a distance between the M-th router and the N-th router is one hop. A distance between the M-th router and the controller is M hops. It should be noted that at least one M-th router has M hops of the distance to the controller. Correspondingly, there is at least one N-th router having N hops of the distance to the controller. A distance between the N-th router and the controller is N hops, where N is greater than or equal to 2. Then, the controller receives an M-th topology discovery response from the M-th router, with the M-th topology discovery response carrying the M-th topology between the M-th router and the N-th router. For example, the M-th topology discovery response may carry an identifier of the N-th router adjacent to the M-th router. Thus, the controller may acquire the M-th topology between the M-th router and the N-th router based on an identifier of the M-th router and the identifier of the N-th router. In this way, the controller acquires information of a router having one hop of the distance to the controller, information of a router having two hops of the distance to the controller, etc and information of a router having N hops of the distance to the controller. Therefore, the controller acquires a topology of a network having N hops and less than N hops of the distance to the controller. The controller stores the topology carried in the M-th topology discovery response in a topology table.

In the above way, the controller may acquire information of each router, such as an identifier of the router, where the router is physically connected to the other router and the distance between the router and the other router is one hop. It may be determined that the controller acquires a topology of a whole network when the controller can not acquire any information of a new router from the M-th topology discovery response.

It should be noted that a format of a content name of the first topology discovery request may be:

CTL/identifier of the first router/RouteTo/controller name/port number, where the port number is a port number of a port of the first router for receiving the first topology discovery request.

It should be noted that a key word may be other key words capable of achieving the above function, and is not limited to CTL and RouteTo.

Correspondingly, the content name of the first topology discovery response has the same format as that of the first topology discovery request.

Further, the content names of the first topology discovery request and the first topology discovery response each may also carry an identifier of a source network node and an identifier of a target network node, such as an identifier of the controller and an identifier of the first router.

Similarly, formats of the M-th topology discovery request and the M-th topology discovery response have the same format as the first topology discovery request and the first topology discovery response, which will not be described herein.

In a second way, the controller receives a topology information report request transmitted by the first router in a broadcasting way. The topology information report request carries an adjacent topology between the first router and an adjacent router. The adjacent router is adjacent to the first router, that is, the first router is physically connected to the adjacent and a distance between the first router and an adjacent router is one hop. It should be noted that each router may transmit a topology information report request to the controller after finishing a neighbor discovery, to inform the controller of a topology of the router. The controller may store the topology in a topology table after receiving topology information. In other words, each router of the routers in the network may transmit the topology information report request in a broadcasting manner, and hence the controller may acquire a topology between the each router of the routers and a router adjacent to the each router of the routers in the network. In this way, the controller may determine a topology among all routers and a topology between each of the routers and the controller based on the topology between each of the routers and a router adjacent to the each of the routers in the network. Finally, the controller transmits the topology information report response to the first router.

It should be noted that a format of a content name of a first topology information report request may be:

TopologyDiscovery/identifier of the first router/port number/identifier of the second router, where the port number is a port number of a port of the first router for transmitting the topology information report request to the second router.

It should be noted that a keyword of the first topology information report is not limited to TopologyDiscovery, which may be other keywords capable of achieving the above function.

Correspondingly, the content name of a first topology information report response may have the same format as that of the first topology information report request.

Further, the content names of the first topology information report response and the first topology information report request each may also carry an identifier of a source network node and an identifier of a target network node, such as the identifier of the first router and the identifier of the controller.

In step 102, the controller acquires routing tables corresponding to respective routers based on the topology and transmits each of the routing tables to a corresponding router.

In the embodiment, a topology table is set in the controller, and a topology of the network is stored in the topology table.

In either of the above two ways, the controller may acquire routing tables corresponding to the respective routers based on the acquired topology, and transmits each of the routing tables to the corresponding router.

Specifically, in the above first way, after acquiring the topology between the first and second routers, i.e. after acquiring the less-than-two-hop topology, the controller may generate a routing table of a less-than-two-hop router based on the topology and transmits the routing table to a router corresponding to the routing table. Next, after acquiring the topology between the M-th router and the N-th router, i.e. after acquiring the less-than-N-hop topology, the controller may generate a routing table of a less-than-N-hop router and transmits the routing table to a router corresponding to the routing table.

Specifically, in the above second way, after acquiring the topology of the whole network, the controller may acquire routing tables corresponding to the respective routers and transmits each of the routing tables to the corresponding router.

In the topology discovery method according to the embodiment, the controller acquires the topology among the N routers; and then acquires routing tables corresponding to the respective router based on the topology and transmits each of the routing tables to a corresponding router. The routing table includes at least one of routing information between the corresponding router and other N−1 routers and routing information between the corresponding router and the controller. In this way, the controller may acquire the topology of the whole network and calculates a routing for an optimal path based on the topology of the whole network, thereby improving the utilization efficiency and throughput of the network.

It should be noted that, based on the above embodiment, in the above second way, step 102 of acquiring, by the controller, routing tables corresponding to the respective routers based on the topology and transmits each of the routing tables to a corresponding router may further include:

acquiring, by the controller, a routing table corresponding to each router of the routers and a routing table corresponding to an adjacent router based on a preset strategy and an adjacent topology between the each router of the routers and the adjacent router; and transmitting, by the controller, the routing tables to the respective routers.

Based on the above embodiment, after acquiring topology of the whole network, the controller may calculate a routing based on the topology stored in the topology table and a preset strategy such as a shortest path strategy, and then transmits the routing to the router. After receiving the routing, the router may store the routing in FIB (Forwarding Information Base, forwarding information base) and update an existing related routing. Next, the controller receives a response from the router, to determine that the router has received the routing from the controller. In this way, paths for the controller to transmitting routings to the respective routers by the controller are established.

Specifically, a format, in which the controller transmits a routing to a target router via the first router, may be:

CTL/identifier of the first router/RouteTo/identifier of the target router/forwarding port number, where the forwarding port number is a port number of a port of the first router for forwarding the routing to the target router.

It should be noted that a keyword is not limited to CTL and RouteTo, which may be other key words capable of achieving the function.

Correspondingly, after transmitting the routing to a network node, the controller may receive a response from the network node. A content name of the response may be the same as a content name that the controller transmits the routing to the target router.

Further, the content name for the controller transmitting the routing to the target router via the first router and the content name of the corresponding response may also carry an identifier of a source network node and an identifier of a target network node, such as the identifier of the controller and the identifier of the target router.

Based on the above embodiment, before the controller acquires the topology among the N routers, step 101 may further include:

transmitting, by the controller, to the first router a neighbor discovery request for requesting an identifier of the first router; or transmitting, by the controller, a neighbor discovery response to a first router in response to a neighbor discovery request received from the first router, where the neighbor discovery request is configured to request an identifier of the controller adjacent to the first router or an identifier of a router adjacent to the first router, and the neighbor discovery response carries the identifier of the controller.

Specifically, before step 101, i.e. before a topology is reported, a neighbor discovery needs to be performed among network nodes in the network, i.e. between the N routers. Then, a network node acquires information of another network node adjacent to the network node, such as an identifier of the other network node. The network node is physically connected to the other network and a distance between the network node and the other network is one hop. For example, the first router acquires identifiers of the controller and the second router adjacent to the first router, or the controller acquires the identifier information of the first router which is adjacent to the controller. It should be noted that the network includes at least one first router and at least one second router.

For example, a format of a content name of the neighbor discovery request transmitted from the controller to the first router may be:

NeighborDiscovery/identifier of the controller/port number, where the port number is a port number of a port, through which the controller transmits the neighbor discovery request to the first router.

It should be noted that a keyword of the neighbor discovery request is not limited to NeighborDiscovery, which may be other key words capable of achieving the function.

The content name of the neighbor discovery response may have the same format as that of the neighbor discovery request.

Further, the content names of the neighbor discovery response and the neighbor discovery request each may also carry an identifier of a source network node and an identifier of a target network node, such as the identifier of the controller and the identifier of the first router.

Figure 2:
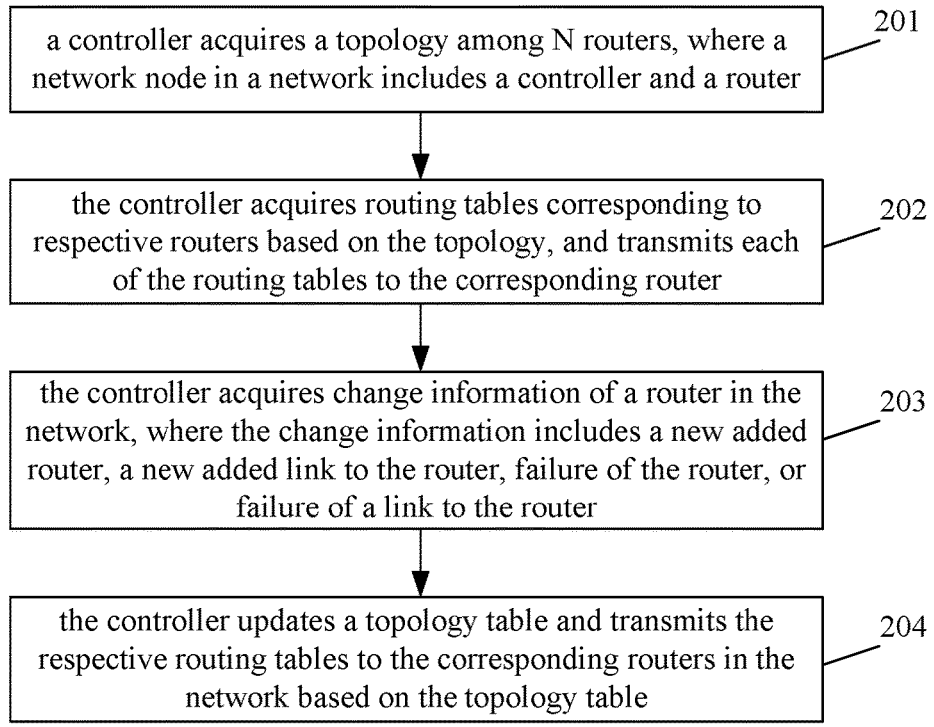
FIG. 2 is a flowchart of a topology discovery method according to another embodiment of the present application.

FIG. 2 is a flowchart of a topology discovery method according to another embodiment of the present application. As shown in FIG. 2, the method according to the embodiment includes:

In step 201, a controller acquires a topology among N routers, where a network node in a network includes a controller and a router.

In step 202, the controller acquires routing tables corresponding to respective routers based on the topology, and transmits each of the routing tables to the corresponding router.

Implementation principles and technical effects of step 201 and step 202 in the embodiment are respectively the same as those of steps 101 and 102, and will not be described herein.

In step 203, the controller acquires change information of a router in the network, where the change information includes a new added router, a new added link to the router, failure of the router, or failure of a link to the router.

In the embodiment, the router may be any one of the routers as a node of the network. In the whole network, if a router experiences changes, such as a new added router into the network, a new added link to the router, i.e. an existed router in the network, failure of the router, or failure of a link to the router, the controller acquires the change information of the router in the network in at least two scenarios as follows.

In a first scenario, the controller may transmit a topology information change query request to a router initiatively in a case that the controller waits the router to transmit information for a time duration exceeding a preset time duration. The router is an 27xisted router in the network such as a first router. For example, the controller may transmit the topology information change query request to the first router or a K-th router having K hops of distance to the first router, to request to query a change of the first router. The K-th router is directly or indirectly connected to the controller, where K is an integer greater than 1. Next, the controller receives a topology information change query response from the first router or the K-th router, with the topology information change query response carrying the change information of the first router.

For example, the controller may transmit the topology information change query request to the first router or the K-th router having K hops of the distance to the first router, to request to query the change of the first router.

For example, a format of a content name of the topology information change query request may be:

CTL/identifier of target router/NeighborInfoUpdate, where the identifier of the target router is an identifier of the first router or an identifier of the K-th router having K hops of distance to the first router.

It should be noted that a keyword of the topology information change query request is not limited to CTL and NeighborinfoUpdate, which may be other key words capable of achieving the function.

In a second scenario, in the network, in a case that the first router is changed, that is, a router is newly added, a new link for the router is added, the router fails or a link connected to the router fails, the changed router may report change information to the controller initiatively according to the above neighbor discovery mechanism.

For example, the router is the first router. The controller may receive a topology information report request carrying the change information of the first router from the first router or the K-th router having K hops of the distance to the first router. The K-th router is directly or indirectly connected to the first router, where K is an integer greater than 1.

For example, a format of a content name of the topology information report request may be:

CTL/a controller name/TopologyDiscovery/an identifier of the first router/a port number/an identifier of a router adjacent to the first router where the port number is a port number of a port of the first router for transmitting the topology information report request to the controller, and the identifier of the first router is an identifier of a router transmitting the topology information report request.

It should be noted that a keyword of the topology information report request is not limited to CTL and Topology-Discovery, which may be other key words capable of achieving the function.

Further, in a path through which the router transmits the topology information report request to the controller, a router in the path may receive the topology information report request and forwards the topology information report request through a forwarding port corresponding to an item of "CTLL/controller name" in an FIB table stored in itself.

The router forwards the topology information report request to all ports in a broadcasting way if it is impossible to forward the topology information report request through the forwarding port due to a topology change.

After receiving the topology information report request, the controller may transmit a topology information report response carrying the request information to the router. The content name of the topology information report response may have the same format as the content name of the topology information report request.

In step 204, the controller updates a topology table and transmits the respective routing tables to the corresponding routers in the network based on the topology table.

After acquiring the change information on the first router in the network, the controller may update the topology table and transmit the respective routing tables to the corresponding router in the network.

In the embodiment, the controller may acquire change information on a router in the network, the change information includes a new added router, a new added link to the router, failure of the router, or failure of a link to the router. The controller may update the topology table and transmit the respective routing tables to the corresponding router in the network based on the topology table. In a case that any router in the network changes, the controller may firstly acquire the change information, thereby avoiding a time delay due to a progressive spreading of changed routing information in the conventional technologies.

Figure 3:
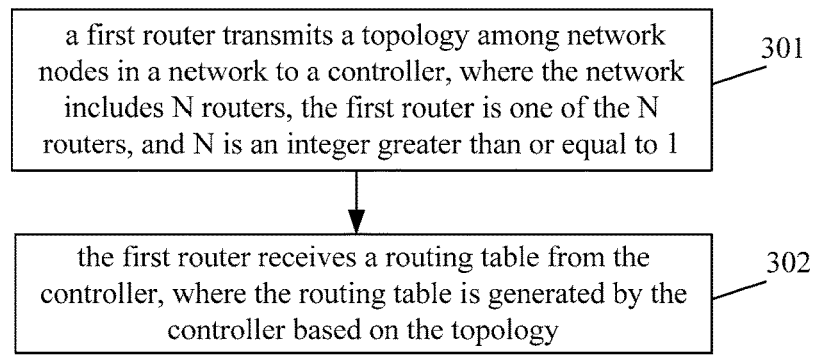
FIG. 3 is a flowchart of a topology discovery method according to yet another embodiment of the present application.

FIG. 3 is a flowchart of a topology discovery method according to another embodiment of the present application. As shown in FIG. 3, the method according to the embodiment includes:

In step 301, a first router transmits a topology among network nodes in a network to a controller, where the network includes N routers, the first router is one of the N routers, and N is an integer greater than or equal to 1.

In the network, the controller is physically connected to an adjacent router, and a router is physically connected to the adjacent router. That is to say, the controller is not necessarily physically connected to all routers in the network directly. However, the controller can interact with all the routers by transmitting control instructions. A physical connection may be a point-to-point adjacent relationship established through a link layer and a physical connection.

The first router may inform the controller of the topology among the network nodes in the network at least in the following two ways.

In a first way, the first router receives from the controller a first topology discovery request for requesting a first topology between the first router and a second router, where the first router is physically connected to the second router and a distance between the first router and the second router is one hop. Next, the first router transmits a first topology discovery response to the controller, where the first topology discovery response carries the first topology between the first router and the second router.

A content name of the first topology discovery request in the first implementation has the same format and implementation as the content name of the first topology discovery request in the above embodiment, which will not described herein.

Further, a content name of a first topology discovery response has the same format and implementation as the content name of the first topology discovery response in the above embodiment, which will not be described herein.

In a second way, the first router transmits a topology information report request carrying an adjacent topology between the first and second routers to the controller in a broadcasting way, where the first router is directly physically connected to the second router and a distance between the first router and the second router is one hop. Next, the first router receives a topology information report response from the controller, where the topology information report response carries the number of hops from the controller to the first router. The first router determines a routing to the controller based on the number of hops and stores the routing into a routing table set on the first router. It should be noted that each router in a routing through which the first router transmits the topology information report request to the controller also forwards the topology information report request in a broadcasting way, such that the request is transmitted to the controller.

A content name of the topology information report request in the first implementation have the same format and implementation as the content name of the topology information report request in the above embodiment, which will not described herein.

Further, a content name of a topology information report response have the same format and implementation as the content name of the topology information report response in the above embodiment, which will not be described herein.

In step 302, the first router receives a routing table from the controller, where the routing table is generated by the controller based on the topology.

In the embodiment, the first router may receive the routing table which is transmitted from the controller and generated by the controller based on the topology, in any one of the above two ways.

Specifically, in the above first way, after the first router informs the controller of the topology among the network nodes in the network, i.e. after the controller acquires a less-than-two-hop topology, the controller may generate a routing table for a less-than-two-hop router based on the topology, and transmit the routing table to a corresponding router. In this way, after acquiring a topology between an M-th router and an N-th router, i.e. acquiring a less-than-N-hop topology, the controller may generate a routing table for a less-than-N-hop router based on the topology, and then transmit the routing table to the corresponding router.

Specifically, in the above second way, after informing the controller of the topology of the whole network, a router may receive a routing table generated by the controller based on the topology.

In the topology discovery method according to the embodiment, the first router transmits the topology among the network nodes in the network to the controller, where the network includes N routers, and the first router is one of the N routers, where N is an integer greater than or equal to 1. Next, the first router receives the routing table from the controller, where the routing table is generated by the controller based on the topology. In this way, the controller may acquire the topology of the whole network and calculate a routing for an optimal path based on the topology of the whole network, thereby improving the utilization efficiency and throughput of the network.

Based on the above embodiment, before the step 301 of the first router informing the controller of the topology among the network nodes in the network, the topology discovery method further includes:

receiving, by the first router, from the controller a neighbor discovery request for requesting an identifier of the first router; or receiving, by the first router, a neighbor discovery response from the controller after a neighbor discovery request is transmitted to the controller, where the neighbor discovery request is configured to request an identifier of the controller adjacent to the first router or an identifier of a router adjacent to the first router, and the neighbor discovery response carries the identifier of the controller.

Specifically, before step 301, a neighbor discovery needs to be performed between the network nodes in the network. Then, a network node acquires information of another network node adjacent to the network node, such as an identifier of the other network node. The network node is physically connected to the other network and a distance between the network node and the other network is one hop. For example, the first router acquires identifiers of the controller and the second router adjacent to the first router, and the first router acquires the identifier information of the controller which is adjacent to the first router. It should be noted that the network includes at least one first router and at least one second router.

It should be noted that a content name of the neighbor discovery request has the same format and implementation as the content of the neighbor discovery request in the above embodiment, which will not described herein.

A content name of a neighbor discovery response may have the same format as the content of the neighbor discovery request.

Further, the content names of the neighbor discovery response and the neighbor discovery request each may carry an identifier of a source network node and an identifier of a target network node, such as an identifier of the controller and an identifier of the first router.

Figure 4:
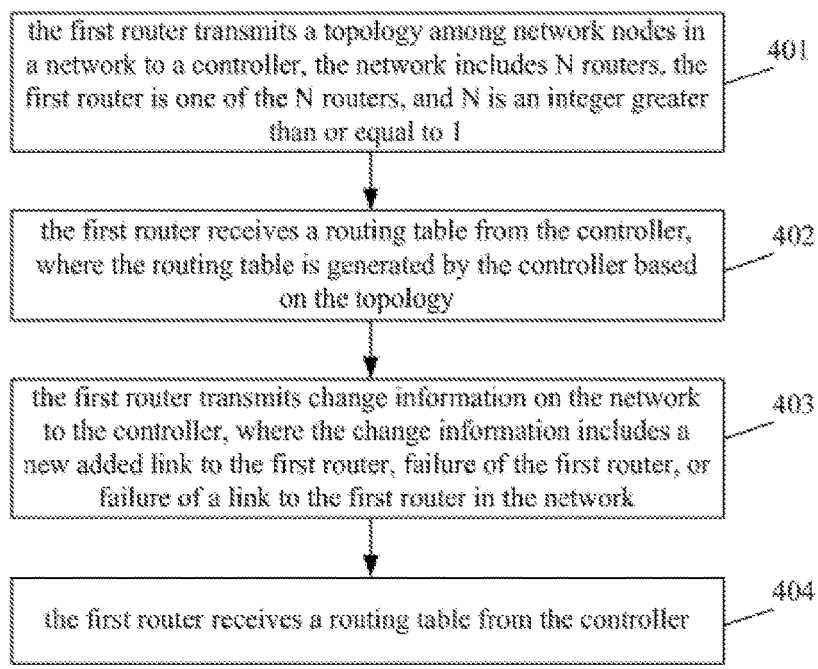
FIG. 4 is a flowchart of a topology discovery method according to yet another embodiment of the present application.

FIG. 4 is a flowchart of a topology discovery method according to yet another embodiment. As shown in FIG. 4, the method according to the embodiment includes:

In step 401, the first router transmits a topology among network nodes in a network to a controller, the network includes N routers, the first router is one of the N routers, and N is an integer greater than or equal to 1.

In step 402, the first router receives a routing table from the controller, where the routing table is generated by the controller based on the topology.

Implementation principles and technical effects of steps 401 and 402 are respectively the same as those of steps 301 and 302, which will not be described herein.

In step 403, the first router transmits change information on the network to the controller, where the change information includes a new added link to the first router, failure of the first router, or failure of a link to the first router in the network.

In the embodiment, the first router is any router of all network nodes in the network. In a whole network, if the first router is changed, for example, a new link to the first router is added, the first router fails or a link to the first router fails, the controller acquires the change information on the first router in the network in at least two scenarios as follows.

In a first scenario, the controller may transmit a topology information change query request to a router initiatively in a case that the controller waits the router to transmit information for a time duration exceeding a preset time duration. For example, the first router receives from the controller the topology information change query request for requesting router change information on the first router. Then, the first router transmits a topology information change query response to the controller, with the topology information change query response carrying the change information on the first router.

A content name of the topology information change query request has the same format and implementation as the content name of the topology information change query request in the above embodiment, which will not described herein.

In a second scenario, in the network, in a case that the first router is changed, i.e. a new link to the first router is added, the first router fails or a link connected to the first router fails, the changed first router may report change information to the controller initiatively according to the above neighbor discovery mechanism.

Specifically, the first router transmits a topology information report request to the controller, with the topology information report request carrying the change information on the first router.

A content name of the topology information report request has the same format and implementation as the content name of the topology information report request in the above embodiment, which will not be described herein.

In step 404, the first router receives a routing table from the controller.

After acquiring the change information on the first router, the controller may firstly update a topology table, and transmits the respective routing tables to the corresponding routers in the network based on the topology table. Then, the first router receives the routing table from the controller.

In the embodiment, the first router informs the controller of change information in the network, the change information includes a new added first router, a new added link to the first router, failure of the first router, or failure of a link to the first router. The first router receives the routing table from the controller. When any one of the routers in the network is changed, the router or the other router around the router may inform the controller of change information, thereby avoiding a time delay due to a hop-by-hop update of the change information in the conventional technologies.

Figure 5:
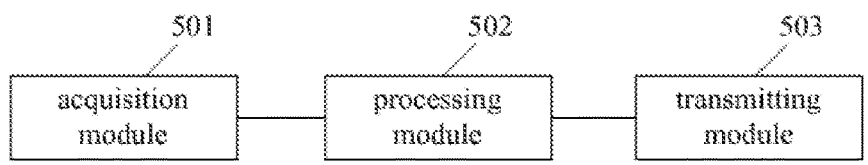
FIG. 5 is a schematic structural diagram of a topology discovery device according to an embodiment of the present application.

FIG. 5 is a schematic structural diagram of a topology discovery device according to an embodiment of the present application. As shown in FIG. 5, the topology discovery device may be provided at a controller, and may include an acquisition module 501 and a processing module 502.

The acquisition module 501 is configured to acquire a topology among N routers, where N is an integer greater than or equal to 1.

The processing module 502 is configured to acquire routing tables corresponding to the respective routers based on the topology, and transmits each of the routing tables to a corresponding router. The routing table includes at least one of routing information between the corresponding router and other N−1 routers and routing information between the corresponding router and the controller.

In the topology discovery device according to the embodiment, the controller acquires the topology among N routers, acquires routing tables corresponding to the respective routers based on the topology, and transmits each of the routing table to the corresponding router. In this way, the controller may acquire a topology of the whole network and calculate a routing for an optimal path based on the topology of the whole network, thereby improving the utilization efficiency and throughput of the network.

Based on the above embodiment, the acquisition module 501 is configured to transmit to a first router a first topology discovery request for requesting a first topology between the first router and a second router, where the first router is physically connected to the second router and a distance between the first router and the second router is one hop, and the first router is physically connected to the controller and a distance between the first router and the controller is one hop; and to receive a first topology discovery response from the first router, with the first topology discovery response carrying the first topology between the first and second routers.

Further, the acquisition module 501 is further configured to transmit to an M-th router an M-th topology discovery request for requesting an M-th topology between the M-th router and an (M+1)-th router, where the M-th router is physically connected to the (M+1)-th router and a distance between the M-th router and the (M+1)-th router is one hop, and a distance between the M-th router and the controller is M hops, where M is an integer greater than or equal to 2 and less than or equal to N; and to receive an M-th topology discovery response from the M-th router, where the M-th topology discovery response carries the M-th topology between the M-th router and the (M+1)-th router.

Optionally, based on the above embodiment, the acquisition module 501 is configured to receive a topology information report request transmitted by each router of the routers in a broadcasting way. The topology information report request carries an adjacent topology between the each router of the routers and an adjacent router of the each router of the routers, and the adjacent router is physically connected to the each router of the routers, and a distance between the adjacent router and the each router of the routers is one hop.

Further, the acquisition module is configured to acquire a routing table corresponding to the each router of the routers and a routing table corresponding to the adjacent router based on a preset strategy and the adjacent topology between the each router of the routers and the adjacent router; and the processing module 502 is configured to transmit the routing tables to the corresponding route.

Based on the above embodiment, the acquisition module 501 is further configured to acquire change information of a router. The change information includes a new added router, a new added link to the router, failure of the router or failure of a link to the router; and the processing module 502 is further configured to acquire a new routing table based on the change information of the router and transmit the new routing table to the corresponding router.

Further, the acquisition module 501 is configured to transmit a topology information change query request to the first router or a K-th router having K hops of a distance to the first router, to request change information of the first router, where the K-th router is directly or indirectly connected to the controller, and K is an integer greater than 1; and receive a topology information change query response from the first router or the K-th router to acquire the change information of the first router.

Based on the above embodiment, the acquisition module 501 is configured to receive a topology information report request from the first router or the K-th router to acquire the change information of the first router. A distance between the K-th router and the first router is K hop, the K-th router is directly or indirectly connected to the controller, and K is an integer greater than 1.

Based on the above embodiment, the device further includes a transmitting module 503. The transmitting module 503 is configured to transmit to a first router a neighbor discovery request for requesting an identifier of the first router; or the transmitting module 503 is configured to transmit neighbor discovery response to a first router in response to a neighbor discovery request received from the first router; where the neighbor discovery request is configured to request an identifier of the controller adjacent to the first router or an identifier of a router adjacent to the first router, and the neighbor discovery response carries the identifier of the controller.

Based on the above embodiment, both the topology information report request and the topology information report response carry at least one of the followings: the same content name, the identifier of the first router, and the identifier of the controller;

both the first topology discovery request and the first topology discovery response carry at least one of the followings: the same content name, the identifier of the first router, and the identifier of the controller; and both an M-th topology discovery request and an M-th topology discovery response carry at least one of the followings: the same content name, the identifier of the M-th router, and the identifier of the controller.

Optionally, both a keyword of the neighbor discovery request and a keyword of the neighbor discovery response are NeighborDiscovery;

a keyword of the first topology discovery request, a keyword of the M-th topology discovery request, a keyword of the first topology discovery response and a keyword of the M-th topology discovery response are CTL and RouteTo;

both a keyword of the topology information report request and a keyword of the topology information report response are TopologyDiscovery;

both a keyword of the topology information change query request and a keyword of the topology information change query response are CTL and NeighborInfoUpdate; and a keyword of the topology information report request is CTL and TopologyDiscovery.

Figure 6:
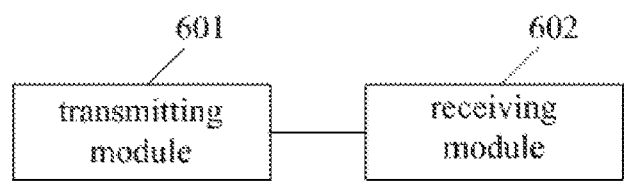
FIG. 6 is a schematic structural diagram of a topology discovery device according to another embodiment of the present application.

FIG. 6 is a schematic structural diagram of a topology discovery device according to another embodiment. As shown in FIG. 6, the topology discovery device may be provided at a router, which includes a transmitting module 601 and a receiving module 602.

The transmitting module 601 is configured to transmit a topology among network nodes in a network to a controller. The network includes N routers, and the topology discovery device is one of the N routers, where N is an integer greater than or equal to 1.

The receiving module 602 is configured to receive a routing table from the controller, where the routing table is generated by the controller based on the topology.

In a topology discovery device according to the embodiment, a first router transmits the topology among the network nodes in the network to the controller. The network includes N routers, and the router is one of the N routers, where N is an integer greater than or equal to 1. Then, the first router receives a routing table from the controller, where the routing table is generated by the controller based on the topology. In this way, the controller may acquire a topology of the whole network and calculate a routing for an optimal path based on the topology of the whole network, thereby improving the utilization efficiency and throughput of the network.

Based on the above embodiment, the receiving module 602 is configured to receive from the controller a first topology discovery request for requesting a first topology between a first router and a second router, where the first router is physically connected to the second router and a distance between the first router and the second router is one hop; and transmit a first topology discovery response to the controller, where the first topology discovery response carries the first topology between the first and second routers.

Based on the above embodiment, the transmitting module 601 is configured to transmit a topology information report request to the controller in a broadcasting way, where the topology information report request carries an adjacent topology between a first router and a second router, and the first router is physically connected to the second router and a distance between the first router and the second router is one hop; and the receiving module 602 is configured to receive a topology information report response from the controller, where the topology information report response carries the number of hops from the controller to the first router, where the first router determines a routing to the controller based on the number of hops and stores the routing in a routing table set on the first router.

Based on the above embodiment, the receiving module 602 is further configured to receive from the controller a neighbor discovery request for requesting a physical identifier of the first router; or the receiving module 602 is further configured to receiving a neighbor discovery response from the controller after a neighbor discovery request is transmitted to the controller, where the neighbor discovery request is configured to request an identifier of the controller adjacent to the first router or an identifier of a router adjacent to the first router, and the neighbor discovery response carries the identifier of the controller.

Based on the above embodiment, the transmitting module 601 is further configured to transmit change information in the network to the controller, where the change information includes a new added link to the first router, failure of the first router or failure of a link to the first router in the network; and the receiving module 602 is further configured to receive the routing table from the controller.

Further, the receiving module 602 is configured to receive from the controller a topology information change query request for requesting to query change information of the first router; and the transmitting module 601 is configured to transmit a topology information change query response to the controller, with the topology information change query response carrying the change information of the first router.

Based on the above embodiment, the transmitting module 601 is configured to transmit a topology information report request to the controller, to inform the controller of the change information of the first router, with the topology information report request carrying the change information of the first router.

Based on the above embodiment, both the topology information report request and a topology information report response carry at least one of the followings: the same content name, the identifier of the first router, and the identifier of the controller;

both the first topology discovery request and the first topology discovery response carry at least one of the followings: the same content name, the identifier of the controller, and the identifier of the first router; and both an M-th topology discovery request and an M-th topology discovery response carry at least one of the followings: the same content name, the identifier of the controller, and an identifier of an M-th router.

Optionally, both a keyword of the neighbor discovery request and a keyword of the neighbor discovery response are NeighborDiscovery;

a keyword of the first topology discovery request, a keyword of an M-th topology discovery request, a keyword of the first topology discovery response and a keyword of an M-th topology discovery response are CTL and RouteTo;

both a keyword of the topology information report request and a keyword of the topology information report response are TopologyDiscovery;

both a keyword of the topology information change query request and a keyword of the topology information change query response are CTL and NeighborinfoUpdate; and a keyword of the topology information report request is CTL and TopologyDiscovery.

Figure 7:
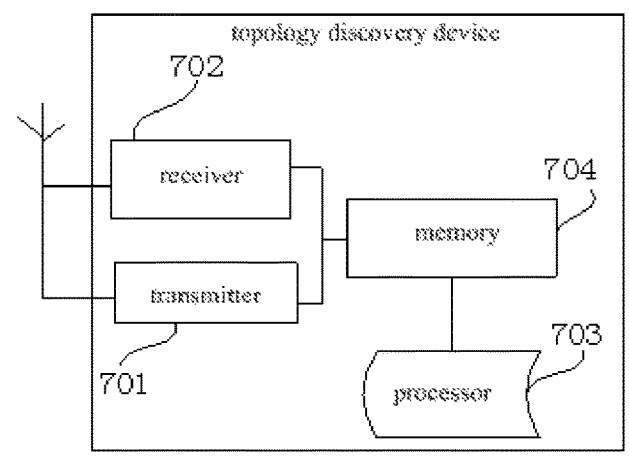
FIG. 7 is a schematic structural diagram of a topology discovery device according to yet another embodiment of the present application.

FIG. 7 is a schematic structural diagram of a topology discovery device according yet another embodiment. As shown in FIG. 7, the topology discovery device may include a transmitter 701, a receiver 702, a memory 703 and a processor 704 connected to the transmitter 701, the receiver 702 and the memory 703. In addition, the topology discovery device may further include a general component such as an antenna, a baseband processing component, a medium radio frequency processing component and an input/output device, which is not limited herein.

The memory 703 is configured to store a group of program codes, and the processor 704 is configured to invoke the program codes stored in the memory 703 to perform the following operations:

acquiring a topology among N routers, where N is an integer greater than or equal to 1; and acquiring routing tables corresponding to the respective routers based on the topology, and transmitting each of the routing tables to a corresponding router; where the routing table includes at least one of routing information between the corresponding router and other N−1 routers and routing information between the corresponding router and the controller.

In the embodiment, the controller acquires the topology of the whole network and may calculate a routing for an optimal path based on the topology of the whole network, thereby improving the utilization efficiency and throughput of the network.

Figure 8:
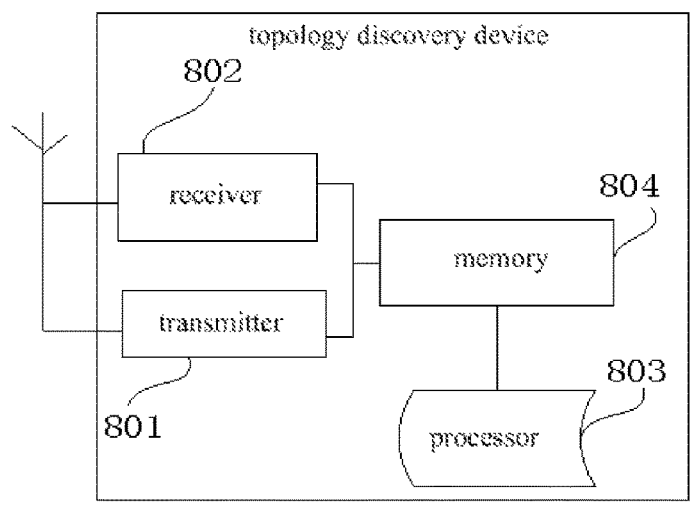
FIG. 8 is a schematic structural diagram of a topology discovery device according to yet another embodiment of the present application.

FIG. 8 is a schematic structural diagram of a topology discovery device according to yet another embodiment. As shown in FIG. 8, the topology discovery device may include a transmitter 801, a receiver 802, a memory 803, and a processor 804 connected to the transmitter 801, the receiver 802 and the memory 803. In addition, the topology discovery device may further include a general component such as an antenna, a baseband processing component, a medium radio frequency processing component and an input/output device, which is not limited herein.

The memory 803 is configured to store a group of program codes, and the processor 804 is configured to invoke the program codes stored in the memory 803 to perform the following operations:

transmitting a topology among network nodes in a network to a controller, where the network includes N routers, and a first router is one of the N routers, where N is an integer greater than or equal to 1; and receiving a routing table from the controller, where the routing table is generated by the controller based on the topology.

In the embodiment, the controller acquires a topology of the whole network and calculates a routing for an optimal path based on the topology of the whole network, thereby improving the utilization efficiency and throughput of the network.

It should be understood by those skilled in the art that, all or part of steps of the above embodiments of method may be completed by instructing related hardware with a program. The aforementioned program may be stored in a computer readable storage medium. The steps of the above embodiments are performed if the program is executed. And the aforementioned storage medium includes various mediums which can store program codes, such as an ROM, an RAM, a diskette or an optical disk.

Finally, it should be noted that, the above embodiments are only for illustrating the technical solutions of the present application, but not intended to limit the present application. Even if the present application is described in detail by referring to the aforementioned embodiments, modifications may be made to the technical solutions according to the aforementioned embodiments or equivalents may be made to all or part of the technical features in the technical solutions, by those skilled in the art without departing from the scope of the technical solutions according to the embodiments of the present application.

What is claimed is:

1. A topology discovery method, comprising:

receiving, by a controller, a neighbor discovery request from each of N routers in a network, wherein the neighbor discovery request for a given router is to request an identifier of a router adjacent to the given router, wherein N is an integer greater than or equal to 2;

transmitting, by the controller, a neighbor discovery response to the each of the N routers, wherein the neighbor discovery response carries an identifier of the controller;

acquiring, by the controller, a topology among the N routers in the network, the acquiring comprising:

transmitting topology discovery requests from the controller to a first hop router until an M-th hop router one hop by one hop, wherein a first topology discovery request is to request a first topology between the first hop router and a second hop router, an M-th topology discovery request is to request an M-th topology between the M-th hop router and an (M+1)-th hop router, wherein M is an integer greater than or equal to 2, the one hop involves at least one router, and the N routers involves the first to the (M+1)-th hop router;

receiving, by the controller, an M-th topology discovery response from the M-th hop router in each one hop;

determining, by the controller, whether the M-th topology discovery response carries an identifier of the (M+1)-th hop router in each one hop;

determining that the M-th topology discovery response carries the identifier of the (M+1)-th hop router;

obtaining, by the controller, the M-th topology between the M-th hop router and the (M+1)-th hop router based on the M-th topology discovery response; and obtaining, by the controller, the topology among the N routers in the network based on each of the topologies from the first topology to the M-th topology;

calculating, by the controller, N routing tables corresponding to the N routers, respectively, based on the topology and a preset strategy;

transmitting, by the controller, a routing table to a corresponding router among the N routers, wherein the corresponding router stores the routing table in a forwarding information base and updates an existing related routing table; and receiving, by the controller, a response transmitted from the corresponding router to determine that the corresponding router has received the routing table transmitted from the controller;

wherein each routing table comprises at least one of the following:
routing information between the router and the other N−1 routers, and
routing information between the router and the controller.

2. The method according to claim 1, wherein after transmitting, by the controller, the routing table to the corresponding router among the N routers, the method further comprises:
acquiring, by the controller, change information of a router, wherein the change information of the router comprises a new added router, a new added link to the router, failure of the router, or failure of a link to the router in the network;
acquiring, by the controller, a new routing table based on the change information of the router; and
transmitting, by the controller, the new routing table to the router corresponding to the new routing table.

3. The method according to claim 2, wherein the acquiring, by the controller, the change information of the router comprising:
transmitting, by the controller, a topology information change query request to the first hop router or a K-th hop router which having K hops of the distance to the first hop router, to request to query change information of the first hop router, where the K-th hop router is directly or indirectly connected to the controller, where K is an integer greater than 1; and
receiving, by the controller, a topology information change query response from the first hop router or the K-th hop router to acquire the change information of the first hop router.

4. The method according to claim 2, wherein the acquiring, by the controller, the change information of the router comprising:
receiving, by the controller, a topology information report request from the first hop router or a K-th hop router to acquire change information of the first hop router; where a distance between the K-th hop router and the first hop router is K hops, the K-th hop router is directly or indirectly connected to the controller, and K is an integer greater than 1.

5. A topology discovery method, comprising:
transmitting, by a router, a neighbor discovery request to a controller, wherein the router is one of N routers in a network, wherein N is an integer greater than or equal to 2;
receiving, by the router, a neighbor discovery response from the controller, wherein the neighbor discovery request is to request an identifier of a router adjacent to the router, and the neighbor discovery response carries an identifier of the controller;
transmitting, by the router, a topology among the N routers in the network to the controller, wherein:
the router receives topology discovery requests, wherein the controller transmits the topology discovery requests to a first hop router until an M-th hop router one hop by one hop, wherein a first topology discovery request is to request a first topology between the first hop router and a second hop router, an M-th topology discovery request is to request an M-th topology between the M-th hop router and an (M+1)-th hop router, wherein M is an integer greater than or equal to 2, the one hop involves at least one router, and the N routers involves the first to the (M+1)-th hop router; and the router transmits an M-th topology discovery response from the M-th hop router to the controller in each one hop, wherein the controller determines whether the M-th topology discovery response carries an identifier of the (M+1)-th hop router in each one hop, the controller determines that the M-th topology discovery response carries the identifier of the (M+1)-th hop router and obtains the M-th topology between the M-th hop router and the (M+1)-th hop router based on the M-th topology discovery response, and the controller obtains the topology among the N routers in the network based on each of the topologies from the first topology to the M-th topology;
receiving, by the router, a routing table from the controller, wherein the routing table is based on the topology and a preset strategy;
storing, by the router, the routing table from the controller in a forwarding information base;
updating, by the router, an existing related routing table; and
transmitting, by the router, a response to the controller, wherein the response is configured to determine that the first router has received the routing table from the controller;
wherein the routing table comprises at least one of the following:
routing information between the router and the other N−1 routers, and
routing information between the router and the controller.

6. The method according to claim 5, wherein after receiving, by the router, the routing table from the controller, the method further comprise:
transmitting, by the router, change information of the router, wherein the change information of the router comprises a new added router, a new added link to the router, failure of the router, or failure of a link to the router in the network; and
receiving, by the router, a new routing table from the controller, wherein the new routing table is based on the change information of the router.

7. The method according to claim 6, wherein the transmitting, by the controller, the change information of the router comprises:
receiving, by the router, a topology information change query request from the controller for requesting to query change information of the router; and
transmitting, by the router, a topology information change query response to the controller, where the topology information change query response carries the change information of the router.

8. The method according to claim 6, wherein the transmitting, by the controller, the change information of the router comprises:
transmitting, by the router, a topology information report request to the controller, to inform the controller of the change information of the router, where the topology information change report request carries the change information of the router.

9. A topology discovery device, comprising:
a processor configured to:
determine whether an M-th topology discovery response carries an identifier of an (M+1)-th hop router in each one hop, to determine that the M-th topology discovery response carries the identifier of the (M+1)-th hop router and obtain the M-th topology between the M-th hop router and the (M+1)-th hop router based on the M-th topology discovery response, to obtain the topology among the N routers in the network based on each of the topologies from the first topology to the M-th topology, and calculate N routing tables corresponding to N routers in a network, respectively, based on a topology among the N routers and a preset strategy, wherein N is an integer greater than or equal to 2;

a transmitter configured to:

transmit a neighbor discovery request to a controller, wherein the device is one of N routers in the network, transmit topology discovery requests to a first hop router until the M-th hop router one hop by one hop, wherein a first topology discovery request is to request a first topology between the first hop router and a second hop router, the M-th topology discovery request is to request the M-th topology between the M-th hop router and the (M+1)-th hop router, wherein M is an integer greater than or equal to 2, the one hop involves at least one router, and the N routers involves the first to the (M+1)-th hop router, transmit the topology among the N routers in the network to the controller, and transmit a first routing table to a first router among the N routers, wherein the first router stores the first routing table in a forwarding information base and updates an existing related routing table; and a receiver configured to:

receive a neighbor discovery response, wherein the neighbor discovery request is to request an identifier of a router adjacent to the each of the N routers, and the neighbor discovery response carries an identifier of the controller, and receive the M-th topology discovery response from the M-th hop router in each one hop, to receive a second routing table from the controller, wherein the second routing table is generated by the controller based on the topology, and to receive a response transmitted from the first router to determine that the first router has received the first routing table;

wherein the first routing table comprises at least one of the following:

routing information between the first router and the other N−1 routers, and routing information between the first router and the controller.

10. The device according to claim 9, wherein the transmitter is further configured to transmit change information of a router to the controller, wherein the change information of the router comprises a new added router, a new added link to the router, failure of the router, or failure of a link to the router in the network; and the receiver is further configured to receive a new routing table corresponding to the router, wherein the new routing table is based on the change information of the router.

11. The method according to claim 10, wherein the transmitter is further configured to transmit a topology information change query request to the first hop router or a K-th hop router which having K hops of the distance to the first hop router, to request to query change information of the first hop router, where the K-th hop router is directly or indirectly connected to the controller, where K is an integer greater than 1; and the receiver is further configured to receive a topology information change query response from the first hop router or the K-th hop router to acquire the change information of the first hop router.

12. The method according to claim 11, wherein the receiver is further configured to receive a topology information report request from the first hop router or a K-th hop router to acquire change information of the first hop router; where a distance between the K-th hop router and the first hop router is K hops, the K-th hop router is directly or indirectly connected to the controller, and K is an integer greater than 1.

13. A topology discovery device, comprising:

a processor; and a memory having processor-executable instructions stored therein, wherein the instructions, when executed by the processor, configure the topology discovery device to:

receive a neighbor discovery request from each of N routers in a network, wherein N is an integer greater than or equal to 2;

transmit a neighbor discovery response to the each of the N routers, wherein the neighbor discovery request for a given router is to request an identifier of a router adjacent to the given router, and the neighbor discovery response carries an identifier of the controller;

acquire a topology among the N routers in the network, the acquiring comprising:

transmitting topology discovery requests from the controller to a first hop router until an M-th hop router one hop by one hop, wherein a first topology discovery request is to request a first topology between the first hop router and a second hop router, an M-th topology discovery request is to request an M-th topology between the M-th hop router and an (M+1)-th hop router, wherein M is an integer greater than or equal to 2, the one hop involves at least one router, and the N routers involves the first to the (M+1)-th hop router;

receiving an M-th topology discovery response from the M-th hop router in each one hop;

determining whether the M-th topology discovery response carries an identifier of the (M+1)-th hop router in each one hop;

determining that the M-th topology discovery response carries the identifier of the (M+1)-th hop router;

obtaining the M-th topology between the M-th hop router and the (M+1)-th hop router based on the M-th topology discovery response; and obtaining the topology among the N routers in the network based on each of the topologies from the first topology to the M-th topology;

calculate N routing tables corresponding to the N routers, respectively, based on the topology and a preset strategy;

transmit a routing table to a corresponding router among the N routers, wherein the corresponding router stores the routing table in a forwarding information base and updates an existing related routing table; and receive a response transmitted from the corresponding router to determine that the corresponding router has received the routing table transmitted from the controller;

wherein the routing table for a router comprises at least one of the following:
  routing information between the router and the other N−1 routers, and
  routing information between the router and the controller.

14. The device according to claim 13, wherein the instructions, when executed by the processor, further configure the topology discovery device to:
  acquire change information of a router, wherein the change information of the router comprises a new added router, a new added link to the router, failure of the router, or failure of a link to the router in the network;
  acquire a new routing table based on the change information of the router; and
  transmit the new routing table to the router corresponding to the new routing table.

15. The device according to claim 14, when the instructions configure the topology discovery device to acquire the change information of the router, the instructions further configure the topology discovery device to:
  transmit a topology information change query request to the first hop router or a K-th hop router which having K hops of the distance to the first hop router, to request to query change information of the first hop router, where the K-th hop router is directly or indirectly connected to the controller, where K is an integer greater than 1; and
  receive a topology information change query response from the first hop router or the K-th hop router to acquire the change information of the first hop router.

16. The device according to claim 14, when the instructions configure the topology discovery device to acquire the change information of the router, the instructions further configure the topology discovery device to:
  receive a topology information report request from the first hop router or a K-th hop router to acquire change information of the first hop router; where a distance between the K-th hop router and the first hop router is K hops, the K-th hop router is directly or indirectly connected to the controller, and K is an integer greater than 1.

* * * * *

UNITED STATES PATENT AND TRADEMARK OFFICE
CERTIFICATE OF CORRECTION

PATENT NO. : 10,291,510 B2  
APPLICATION NO. : 14/996799  
DATED : May 14, 2019  
INVENTOR(S) : Xuan et al.

Page 1 of 1

It is certified that error appears in the above-identified patent and that said Letters Patent is hereby corrected as shown below:

In the Claims

Claim 5, Column 26, Line 24 "first router has received" should read -- router has received --.

Claim 9, Column 27, Line 46 "routing information between the first router" should read -- routing information between the router --.

Claim 9, Colum 27, Line 48 "routing information between the first router" should read -- routing information between the router --.

Signed and Sealed this  
Fourth Day of February, 2020

Andrei Iancu  
*Director of the United States Patent and Trademark Office*